Jan. 20, 1948.    J. J. OSPLACK    2,434,810
APPARATUS FOR DRESSING INVOLUTE PROFILES
Filed Aug. 18, 1944    12 Sheets-Sheet 1

INVENTOR
JOSEPH J. OSPLACK
BY
Pennie, Davis, Marvin & Edmonds
ATTORNEYS

Jan. 20, 1948.    J. J. OSPLACK    2,434,810
APPARATUS FOR DRESSING INVOLUTE PROFILES
Filed Aug. 18, 1944    12 Sheets-Sheet 2

INVENTOR
JOSEPH J. OSPLACK
BY
Pennie, Davis, Marvin & Edmonds
ATTORNEYS

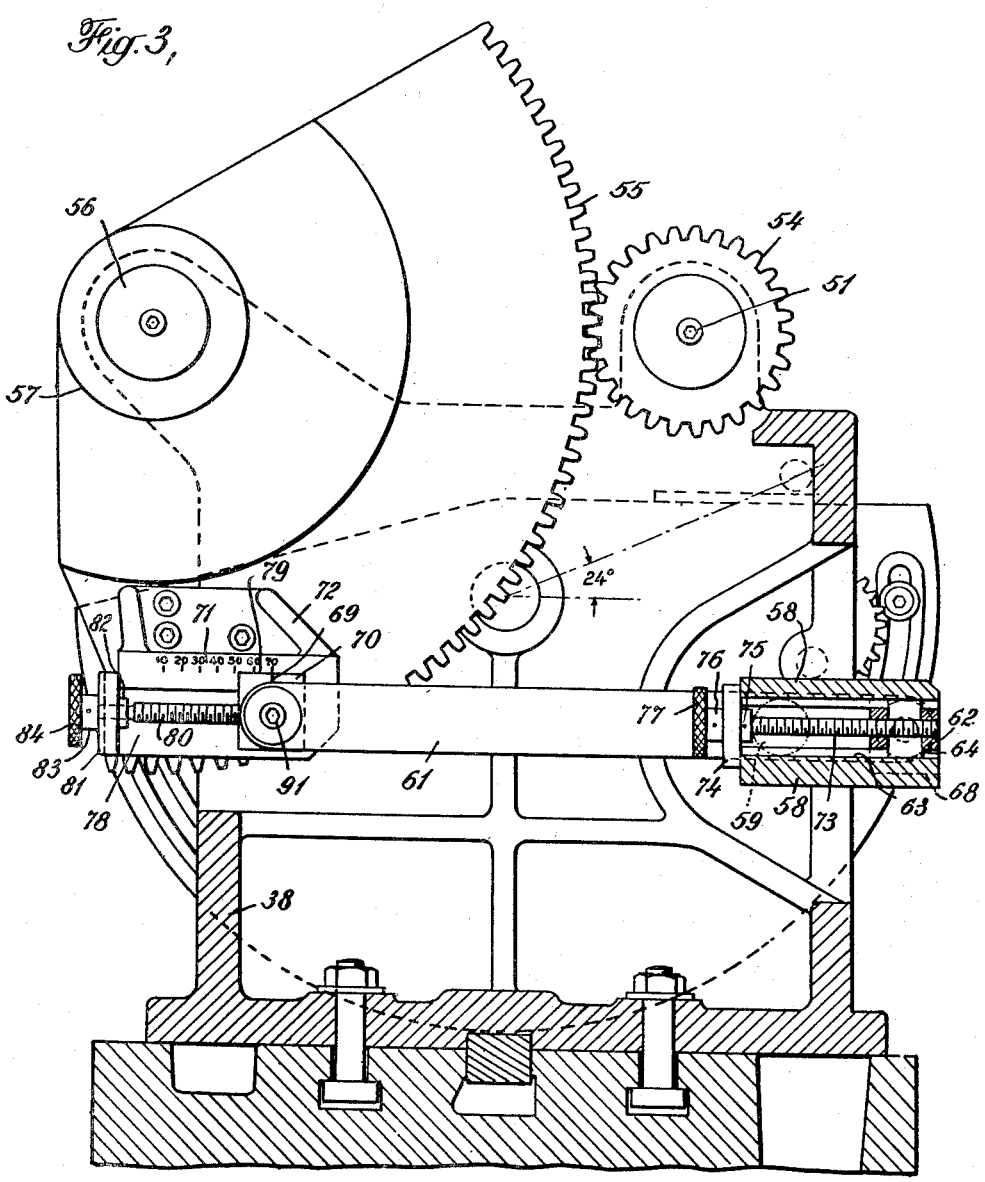

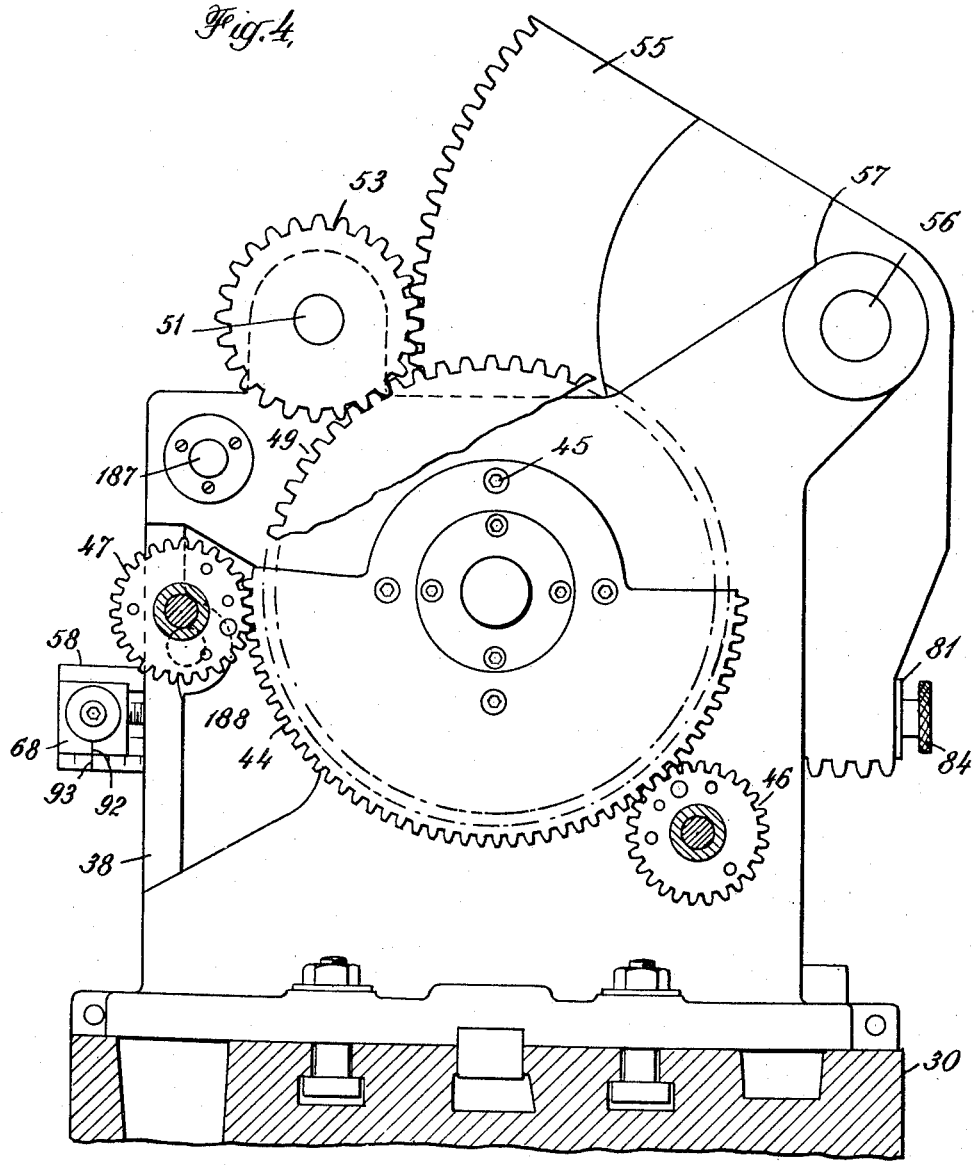

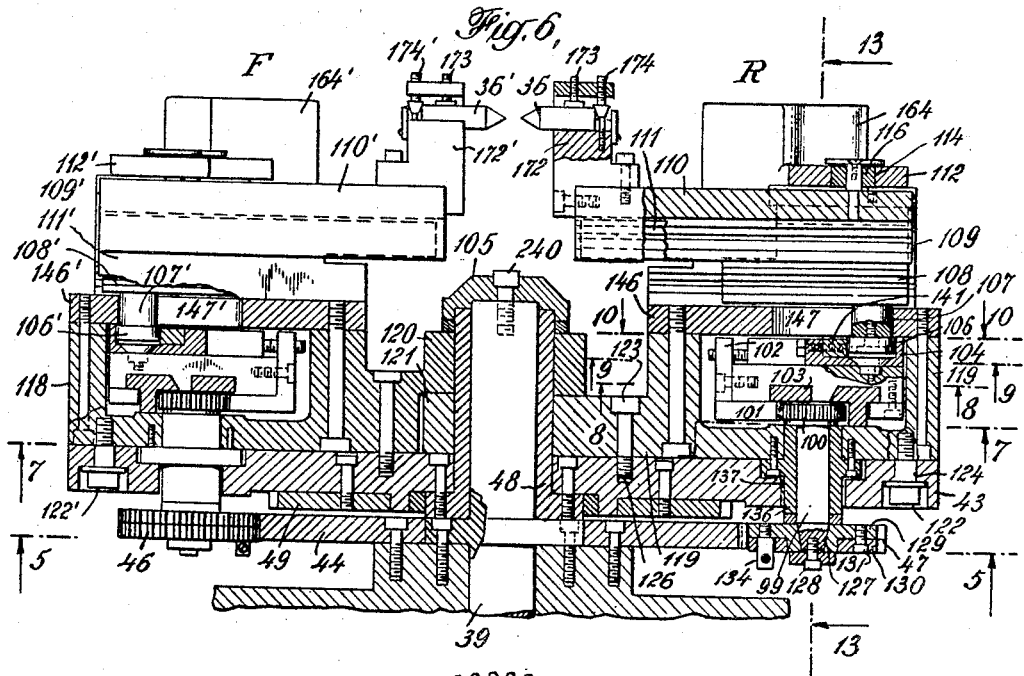

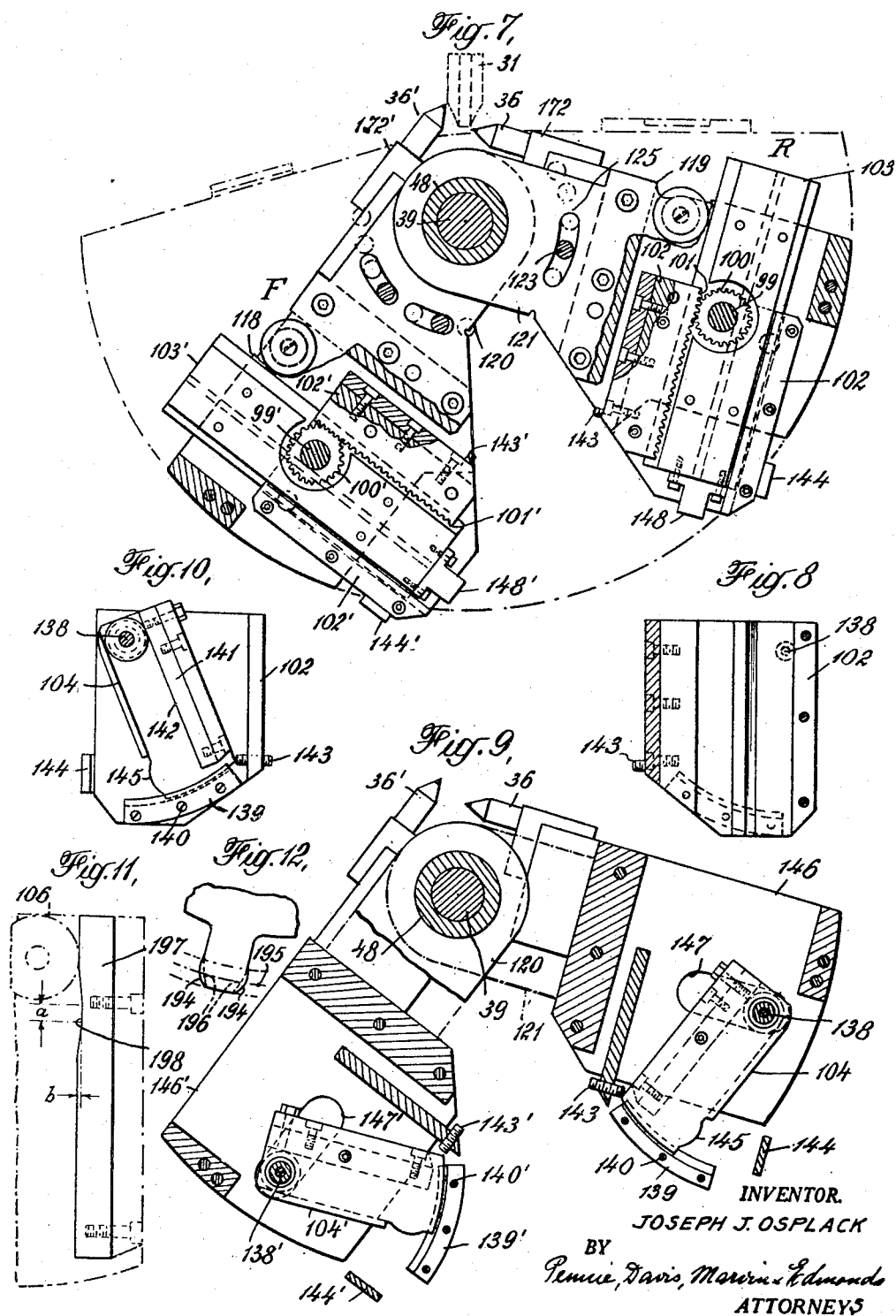

Jan. 20, 1948.    J. J. OSPLACK    2,434,810
APPARATUS FOR DRESSING INVOLUTE PROFILES
Filed Aug. 18, 1944    12 Sheets-Sheet 7
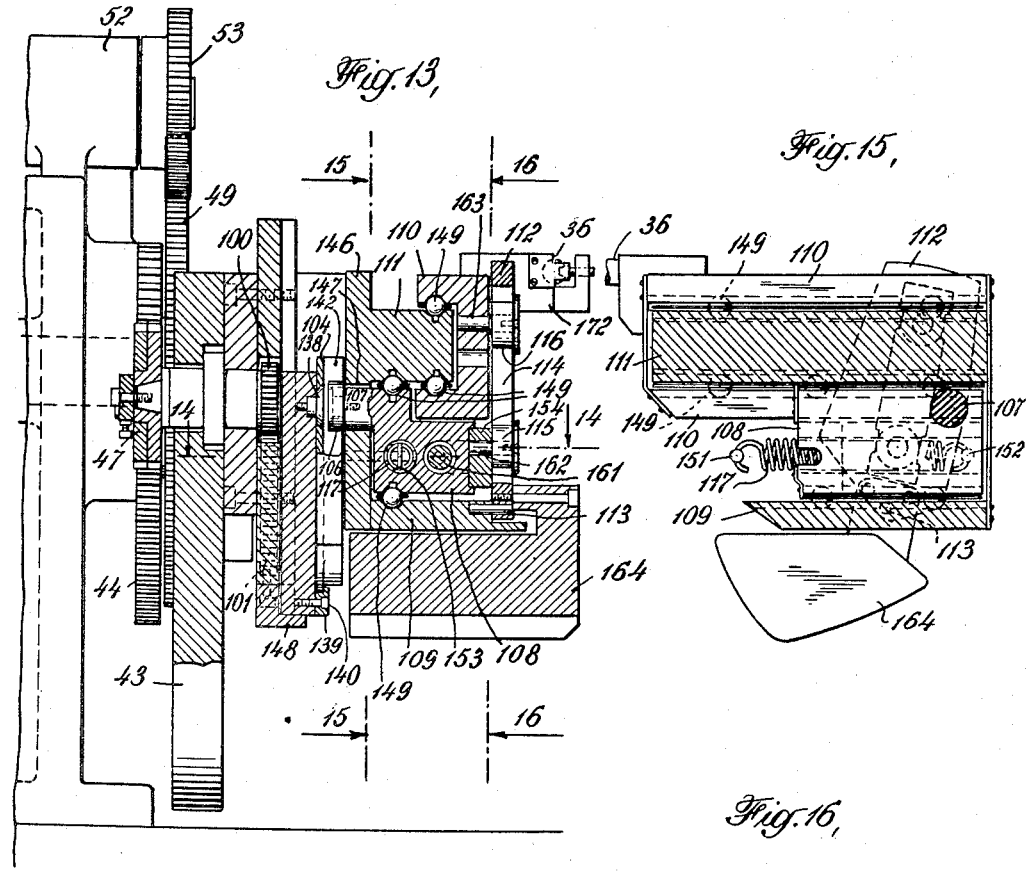
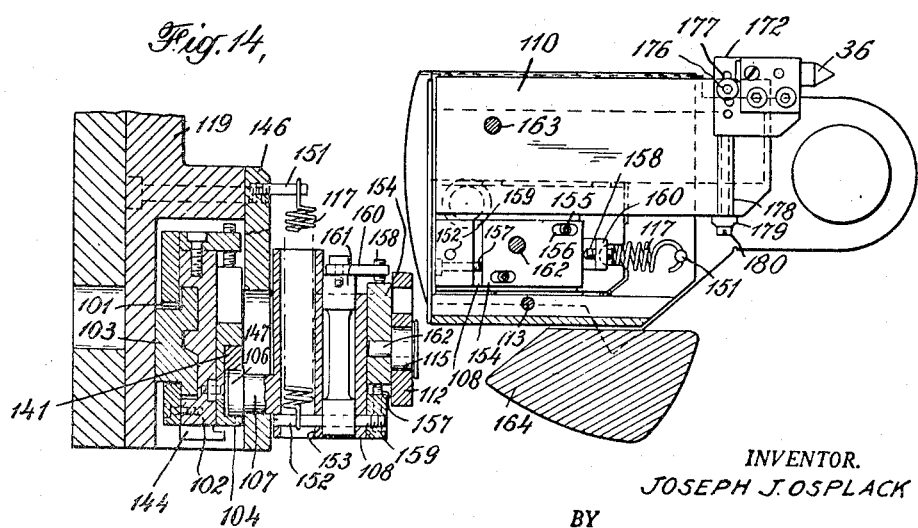
INVENTOR.
JOSEPH J. OSPLACK
BY
Pennie, Davis, Marvin & Edmonds
ATTORNEYS Jan. 20, 1948. J. J. OSPLACK 2,434,810
APPARATUS FOR DRESSING INVOLUTE PROFILES
Filed Aug. 18, 1944 12 Sheets-Sheet 9
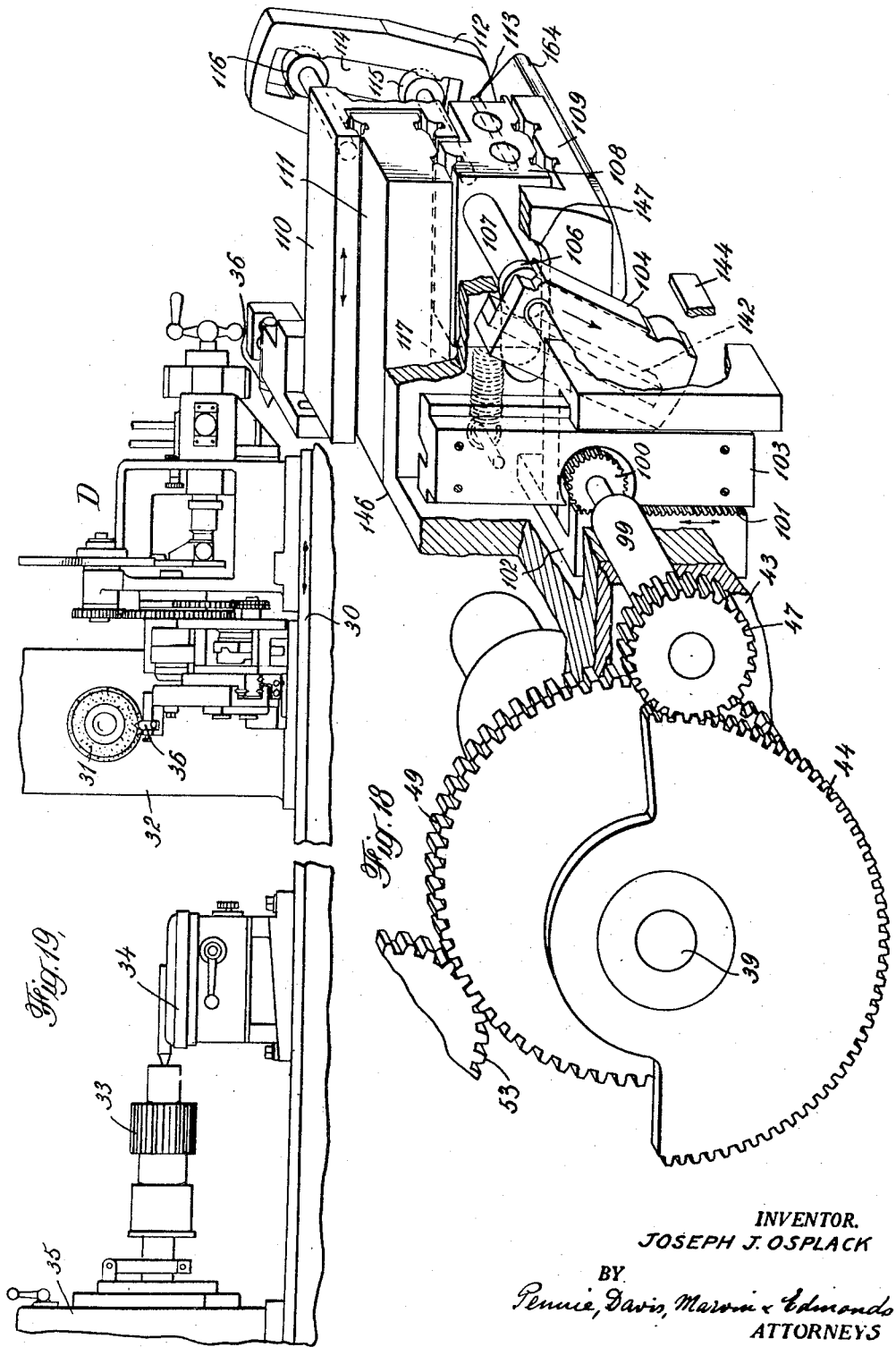
INVENTOR.
JOSEPH J. OSPLACK
BY
Pennie, Davis, Marvin & Edmonds
ATTORNEYS Jan. 20, 1948.  J. J. OSPLACK  2,434,810
APPARATUS FOR DRESSING INVOLUTE PROFILES
Filed Aug. 18, 1944  12 Sheets-Sheet 10
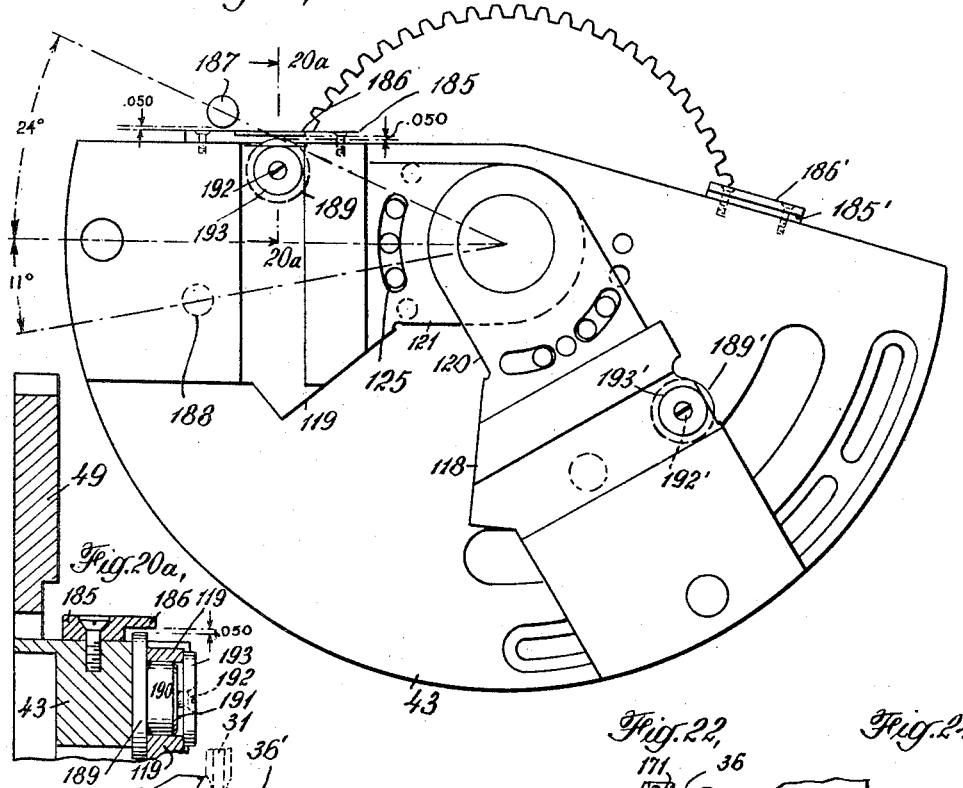
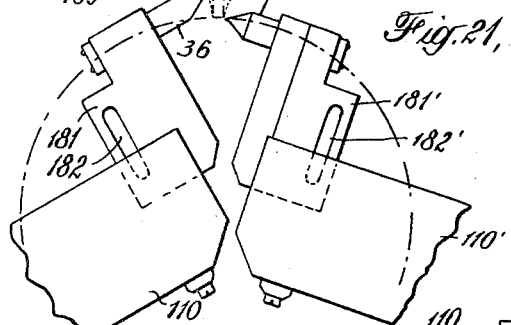
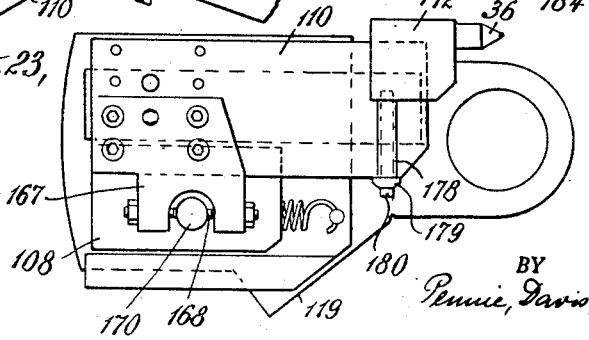
INVENTOR.
JOSEPH J. OSPLACK
BY
Pennie, Davis, Marvin & Edmonds
ATTORNEYS

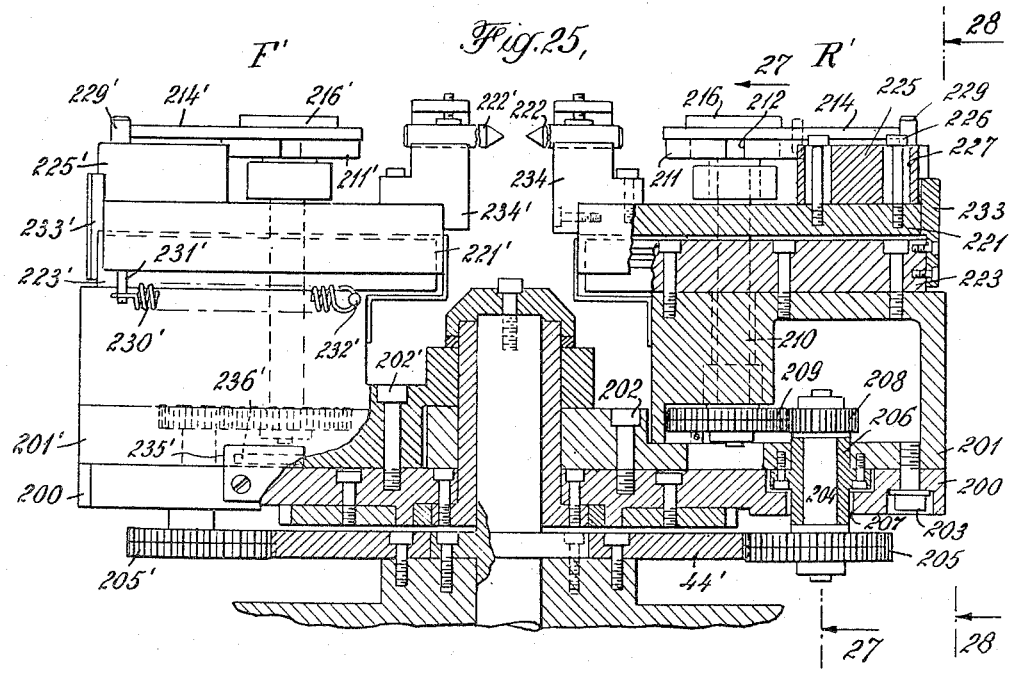

Jan. 20, 1948.   J. J. OSPLACK   2,434,810
APPARATUS FOR DRESSING INVOLUTE PROFILES
Filed Aug. 18, 1944   12 Sheets-Sheet 12
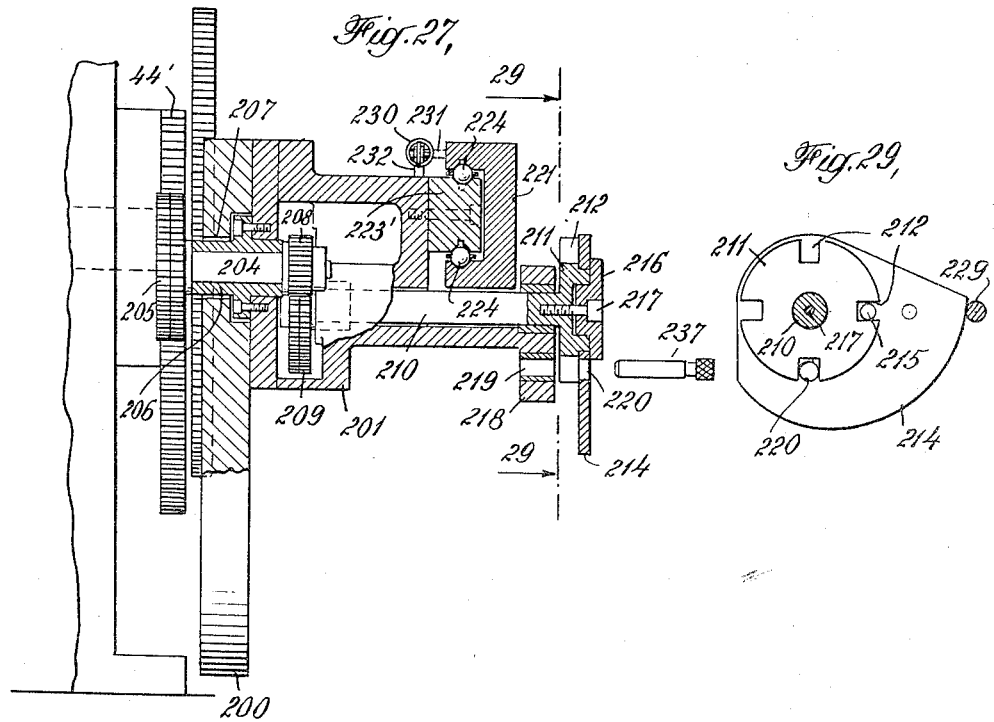
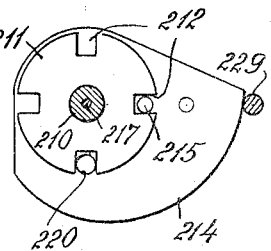
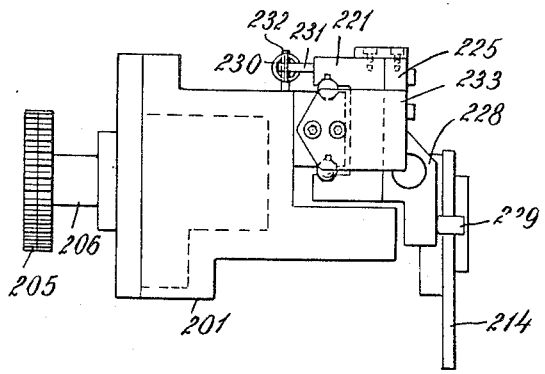
INVENTOR.
JOSEPH J. OSPLACK
BY
Pennie, Davis, Marvin & Edmonds
ATTORNEYS Patented Jan. 20, 1948

2,434,810

UNITED STATES PATENT OFFICE 2,434,810

APPARATUS FOR DRESSING INVOLUTE PROFILES

Joseph J. Osplack, Detroit, Mich., assignor to Vinco Corporation, Detroit, Mich., a corporation of Michigan Application August 18, 1944, Serial No. 550,087

16 Claims. (Cl. 125—11)

This invention relates to apparatus for dressing involute profiles and more particularly concerns improved apparatus for dressing such profiles on the cutting faces of grinding wheels employed in grinding gears, splines and other involute elements.

An object of the invention is to provide apparatus which is inherently capable of accurately dressing surfaces, such as the cutting faces of a gear grinding wheel, to a true involute profile without the use of any special templates, jigs, or other preformed means having involute curvature. In other words, the involute dresser of the present invention is inherently capable of producing true involute motion of the dressing or cutting point.

The objects of the invention further include the provision of apparatus of the type described which is adjustable to dress any involute profile within a wide range of sizes and which can be rapidly and accurately adjusted to such different sizes by operations involving no more complicated steps than the setting of linear distances between elements. A further object of the invention is the provision of an involute dresser employing a plurality of cutting points so manipulated as to be capable of simultaneously shaping or dressing two adjacent involute profiles such as the opposite cutting faces of a gear grinding wheel. Another object of the invention is the provision of an involute dresser capable of cutting or dressing a surface to a curvature that is basically involute but is modified to provide a recessed or raised area, as desired, which may also have involute curvature, on the gear tooth surface at and adjacent the pitch circle of the gear, or at any desired point on the involute profile. The objects of the invention further include the provision of an involute dresser in which the cutting or dressing point or points are so moved during the dressing operation that their axes are at all times tangent to the base circle of the involute profile being dressed or cut. The invention also provides mechanism for moving and reversing the direction of movement of the dresser points without shock, dwell or other sudden disturbance, whereby chattering, jumping or other irregular movement of the points and resulting inaccuracy of the dressing operation is avoided.

The above and other objects of the invention are achieved in general by providing mechanism including a plate or equivalent element mounted to turn about a fixed axis concentric with the base circle of the gear or part being finished, a cutting or dressing point or tool such as a diamond point dressing element slidably supported on the plate to move along a straight path tangent to a circle concentric with the plate axis, and mechanism for simultaneously turning the plate about its axis and moving the point along a straight path relative to the plate at a rate directly proportional to the rate of movement of the plate about its axis.

In a preferred embodiment of the invention, two oppositely disposed points are thus slidably mounted on a single plate and the plate is oscillated about its axis by a crank motion mechanism. Sliding motion of the points relative to the plate is produced by a connection between the plate and a stationary part. In one embodiment, the stationary part comprises a toothed gear surface concentric with the plate axis, and pinions rotatably supported by the plate engage this surface and are turned when the plate turns. Rotary movement of each pinion is translated to sliding movement of the corresponding point by suitable mechanism which may include a sliding cam bar having a plane surface set at an angle to its path of travel and operating a cam follower connected to the point. Means are preferably provided for adjusting the angle of the cam bar, whereby the rate and extent of movement of the point may be variably adjusted. In a preferred form of the invention, the connections to the stationary part are separable, and the points and their sliding supports and operating mechanisms are adjustably movable circumferentially of the plate to permit easy and accurate setting of the starting positions and the angles of stroke of the points, as well as the tooth thicknesses of the involute profiles cut or dressed. In one form of the invention, a cam bar having an offset area on its follower engaging surface produces motion of the point to cut or dress a modified involute profile having a raised or depressed portion at and adjacent to the pitch circle of the involute gear tooth or at any desired position on the involute profile. In accordance with another modification of the invention, circular cams are employed in place of the plane or flat surfaced cam bar construction above referred to.

Other objects, advantages and characteristic features of the invention will be apparent from the appended description of certain specific embodiments thereof.

In describing the invention in detail, reference will be made to the accompanying drawings in which certain embodiments of the invention have been illustrated. In the drawings;

Fig. 3 is a sectional view taken along the line 3—3 of Fig. 1 and viewed in the direction of the arrows;

Fig. 4 is a sectional view taken along the line 4—4 of Fig. 1 and viewed in the direction of the arrows;

Fig. 5 is a sectional view taken along the line 5—5 of Fig. 1 and viewed in the direction of the arrows;

Fig. 6 is a sectional view taken along the line 6—6 of Fig. 5 and viewed in the direction of the arrows;

Fig. 7 is a sectional view taken along the line 7—7 of Fig. 6 and viewed in the direction of the arrows;

Fig. 8 is an elevation of the inside face of the cam bar slide employed in the dresser disclosed in the preceding figures.

Fig. 9 is an elevation, partly in section, taken along the line 9—9 of Fig. 6;

Fig. 10 is an elevation of the outside face of the cam bar slide shown in Fig. 8;

Fig. 11 is an elevation on an enlarged scale illustrating a modified form of cam bar for producing a modified involute surface;

Fig. 12 is a diagrammatic illustration of a gear tooth embodying the modified involute surface resulting from the use of a cam bar of the type illustrated in Fig. 11;

Fig. 13 is a sectional view taken along the line 13—13 of Fig. 6 and viewed in the direction of the arrows;

Fig. 14 is a sectional view taken along the line 14—14 of Fig. 13 and viewed in the direction of the arrows;

Fig. 15 is a sectional view taken along the line 15—15 of Fig. 13 and viewed in the direction of the arrows;

Fig. 16 is a sectional view taken along the line 16—16 of Fig. 13 and viewed in the direction of the arrows;

Fig. 18 is an exploded perspective view illustrating the operating mechanism of the dresser;

Fig. 19 is a front elevation of a dresser embodying the present invention set up on a grinder bed in conjunction with a grinding wheel to be dressed and a spline to be ground thereby;

Fig. 20 is an end elevation of the dresser with certain parts removed to show the procedure employed in making certain adjustments thereof;

Fig. 20a is a sectional view taken along the line 20a—20a of Fig. 20 and viewed in the direction of the arrows;

Fig. 21 is an end elevation of the diamond points of the dresser showing a form of diamond point holder employed for large base circle gears;

Fig. 22 is a front elevation of one of the dresser point holders shown in Fig. 21;

Fig. 23 is an end elevation showing a dresser point slide arranged for small base circle gears;

Fig. 24 is an end elevation on an enlarged scale showing the details of one form of diamond point holder employed in the dresser of the present invention;

Fig. 25 is a plane view, partly in section, illustrating the diamond point operating section of a dresser embodying a modified form of the invention;

Fig. 26 is an end elevation of the dresser mechanism illustrated in Fig. 25;

Fig. 27 is a sectional view taken along the line 27—27 of Fig. 25 and viewed in the direction of the arrows;

Fig. 28 is an end view of one of the diamond point units of the dresser of Fig. 25 taken in the direction of the arrows 28 on Fig. 25; and Fig. 29 is an end elevation of the diamond point propelling cam of the mechanism shown in Figs. 25 through 28.

Figure 1:
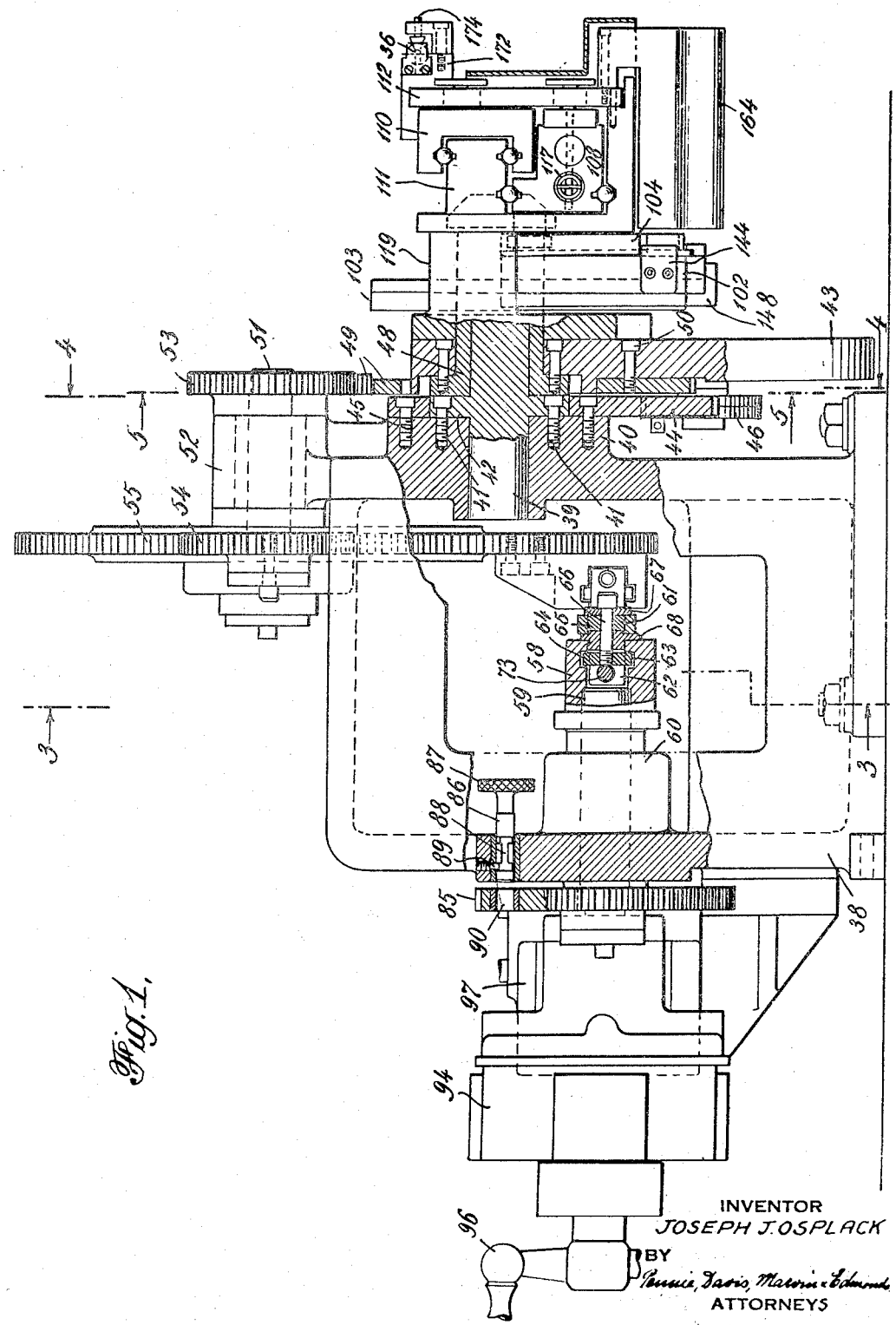
Fig. 1 is a rear elevation, partly in section, of an involute dresser embodying the invention.

The disclosed embodiment of my improved involute dresser is designed to simultaneously dress involute profiles on opposite faces of a gear grinding wheel. As illustrated in Fig. 19, the dresser, generally indicated at D, may be mounted on a horizontally movable carriage 30, over which the gear grinding wheel 31 is suitably mounted on a stand 32 and arranged to rotate about a horizontal axis extending transversely of the carriage 30. The stand 32 may be suitably arranged to permit vertical movement of the wheel 31 with its axis in the horizontal position shown. The work to be ground is illustrated as a spline 33 and is mounted adjacent the left hand end of the carriage 30 between a tail stock 34 and an indexing head 35. When it is desired to dress the wheel 31 to the desired involute profiles, the carriage 30 is moved to the left to the position shown in Fig. 19 until the diamond points 36 and 36' of the dresser D are in a vertical plane passing through the axis of the wheel 31, whereupon the wheel is rotated and dressed in a manner to be described. After the dressing operation is completed, the carriage 30 is moved to the right until the involute profiles on the wheel 31 engage the tooth surfaces of the spline 33, whereupon the work is ground by the wheel.

In describing the disclosed embodiments of my improved dresser in detail, the elevation of the dresser presented in Fig. 19 will be termed the front thereof and the opposite elevation the rear thereof.

Figure 2:
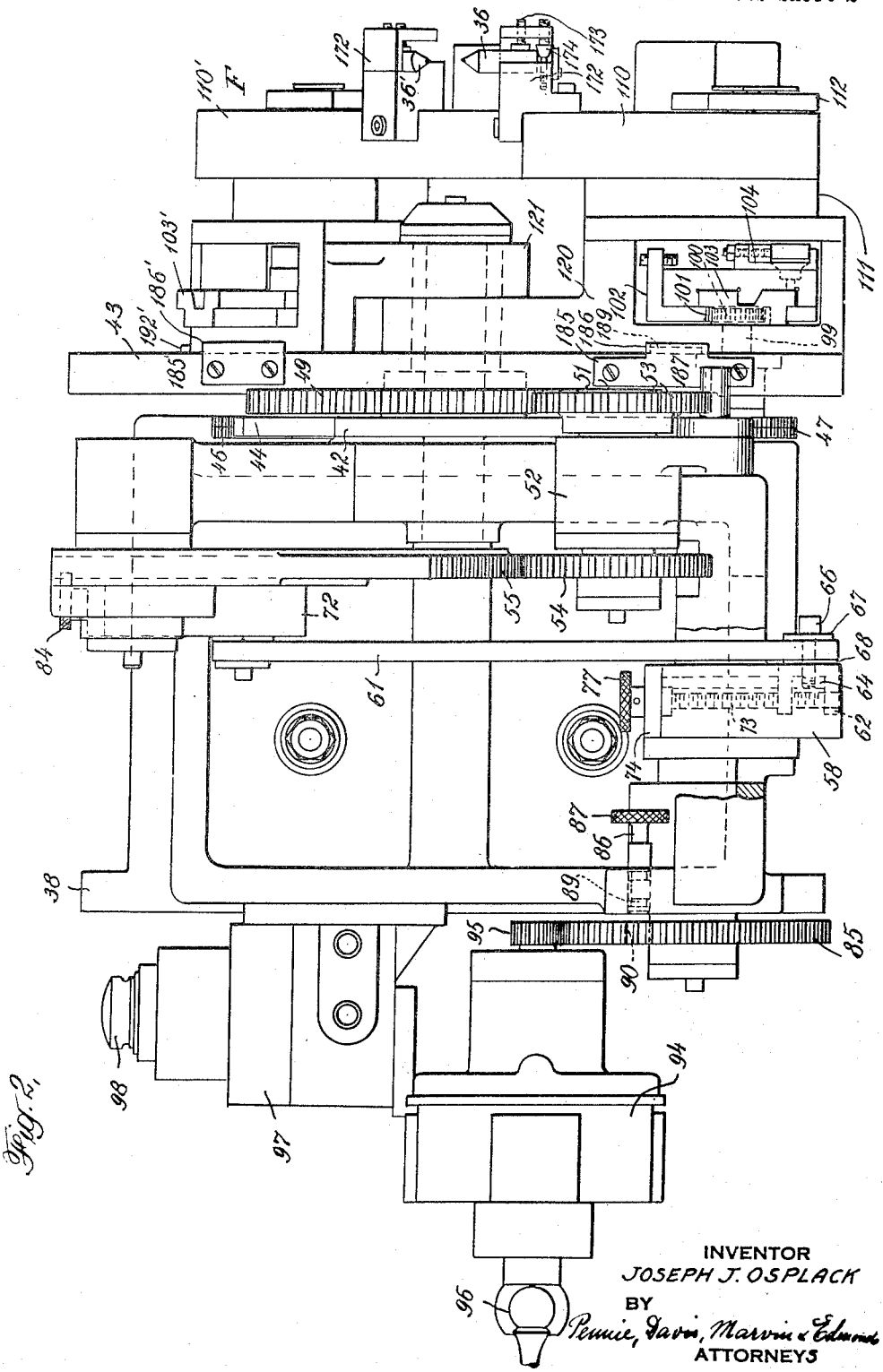
Fig. 2 is a plan view of the dresser shown in Fig. 1.
Figure 17:
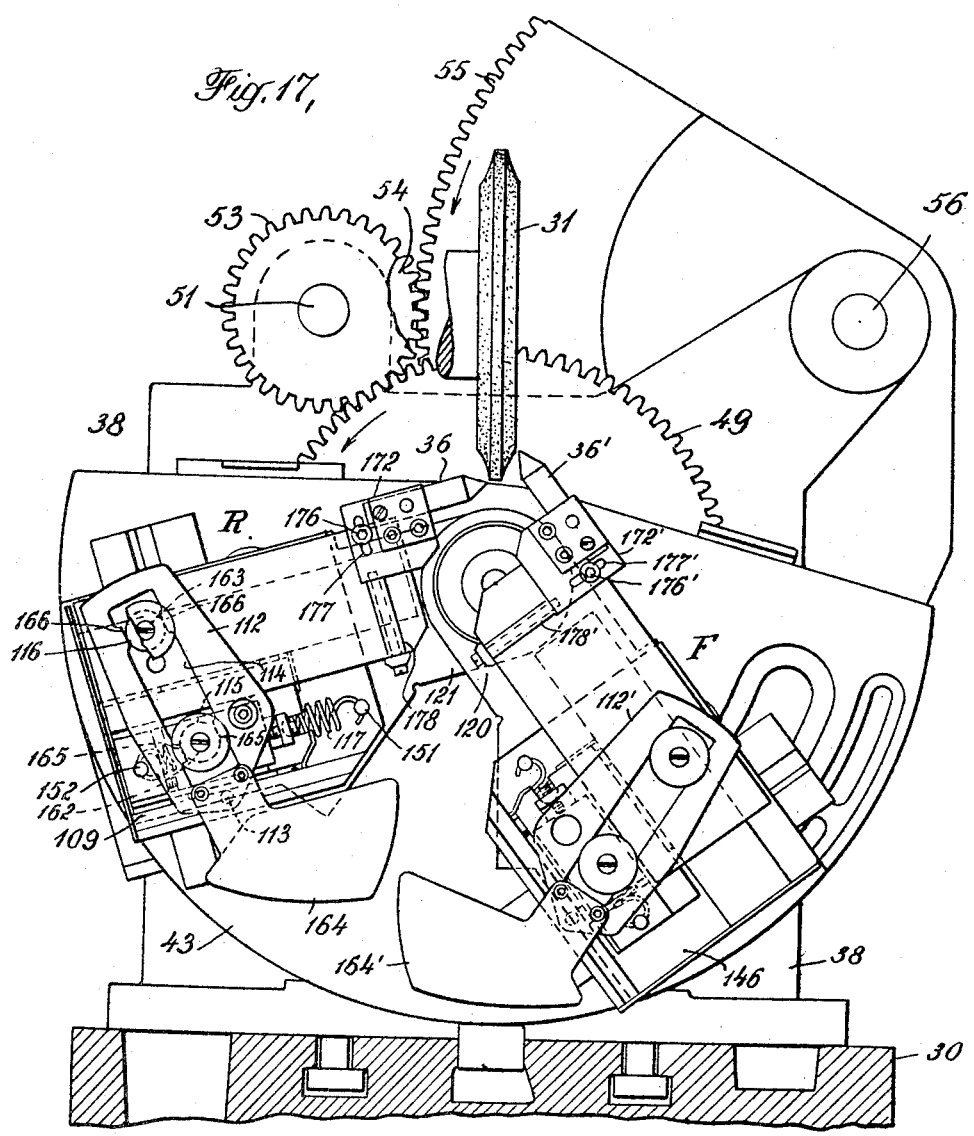
Fig. 17 is an end elevation of the dresser.

Referring now more particularly to Figs. 1, 2 and 17, the dresser there illustrated includes a frame 38 suitably bolted to the carriage 30. A horizontal stub shaft 39 is fixed to a part 40 of the frame 38 by machine screws 41 passing through a flange 42 integral with the shaft 39. The shaft 39 forms the main rotational axis of the dresser about which a plate 43 carrying a front dresser unit F and a rear dresser unit R rotates (Figs. 2 and 17).

The plate 43 is oscillated about the shaft 39 by mechanism to be described and as a consequence of such oscillation, the diamond points 36 and 36' are reciprocated relative to the plate 43 in straight paths tangent to circles concentric with the axis of the plate and at a rate directly proportional to the rate of movement of the plate about the shaft 39. The reciprocatory movement of the diamond points 36 and 36' is derived from the rotary movement of the plate 43 relative to a fixed part, in the illustrated case, a gear segment 44 secured to the frame part 40 by machine screws 45. In general, the driving connection for each of the diamond points 36 and 36' includes a pinion, 46 or 47, rotatably supported by the plate 43 and engaging the gear segment 44, and acting, through suitable mechanism to be described, to impart reciprocatory movement to the diamond point upon oscillation of the plate 43.

The mechanism for oscillating the plate 43 about the shaft 39 will now be described (Fig. 1). A bushing 48 is fixed to the plate 43 and lies between it and the stub shaft 39. A gear 49 is fixed to the inner face of the plate 43 by the machine screws 50. A short shaft 51 journaled in an extension 52 of the machine frame 38 carries a pinion 53 engaging the gear 49 and a pinion 54 engaging a gear segment 55. The gear segment 55 is journaled on a stub shaft 56 carried by an extension 57 at the front of the frame 38. The segment 55 is reciprocated by a crank 58 fixed to the end of a shaft 59 journaled in a frame part 60, a connecting rod 61 serving to link the crank 58 to the segment 55 as shown in Fig. 3. The opposite ends of the rod 61 are respectively adjustably secured to the crank 58 and the segment 55 in order to permit adjustment of the stroke angle through which the plate 43 is reciprocated.

The adjustable connections of the rod 61 are best shown in Figs. 1, 2, 3 and 4. As shown in Fig. 3, a bifurcated lug 62 is slidably supported in slideways 63 extending lengthwise of the crank 58 by means of a cross member 64. A bushing part 65 is fixed to the lug 62 by a threaded and headed pin 66, and the rearward end of the connecting rod 61 is journaled on the bushing 65 between a washer 67 and a plate 68. The pin 66 clamps the cross member 64 in the ways 63 and so locks the connecting rod pivot in its adjusted position. An index mark 92 on the plate 68 registers with a scale 93 on the face of the crank 58 to indicate the amount of adjustment (Figs. 3 and 4). An adjusting screw 73 threadedly engages the arms of the lug 62 and is journaled in a plate 74 fixed to the inner end of the crank 58. Collars 75 and 76 prevent axial movement of the screw 73 relative to the plate 74, and a knurled knob 77 is fixed to the outer end of the screw as shown. Rotation of the screw 73 moves the lug 62 to various adjusted positions along the crank 58, thereby shortening or lengthening the effective crank arm or throw.

The front end of the connecting rod 61 is adjustably secured to the gear segment 55 by mechanism substantially identical with that described for securing the rearward end of the rod to the crank 58. A fixture 72 secured to the gear segment 55 has longitudinally extending ways 78 slidably supporting a lug 79 to which the journal bushing for the front end of the connecting rod 61 is clamped by a threaded and headed pin 91. An adjusting screw 80 threadedly engages the lug 79 and is journaled in a plate 81 fixed to the front end of the fixture 72. Collars 82 and 83 prevent axial movement of the screw 80 through the plate 81, and a knurled knob 84 is fixed to the end of the screw. A plate 70 fixed to the lug 79 carries an index mark 69 registering with a scale 71 on the fixture 72.

When the stroke angle is to be adjusted, the crank 58 is fixed in its extreme rearward position as shown in Fig. 3 by means to be described and the knurled knobs 77 and 84 are turned simultaneously whereby the effective arm of the crank 58 is altered without change in the zero or starting position of the gear segment 55.

A gear 85 is fixed to the shaft 59. Means are provided for temporarily fixing this gear in such positions that the crank 58 is in its extreme rearward position as shown in Fig. 3 or in its extreme forward position turned 180° from the position there shown. To this end, a locking pin 86 with a knurled head 87 is slidably carried in an opening through the machine frame adjacent the gear 85. The pin 86 has an H-shaped slot 88 therein and the end of a set screw 89 fixed in the frame engages this slot. The arrangement is such that when the pin 86 is retracted and turned as shown in Fig. 1, it is locked against outward movement.

By turning the pin 86 through a small angle, it may be extended to engage either one of two diametrically opposite openings in the gear 85, one of which is shown at 90. The pin 86 may be again turned after it is extended to lock the pin in its extended position. Extension of the pin into one of the openings locks the driving mechanism in one or the other of the positions described.

Any suitable source of power may be employed to drive the dresser mechanism, and an electrical motor may be used for that purpose. In the disclosed embodiment, a hydraulic motor 94 is employed and is suitably mounted with its output pinion 95 in engagement with the gear 85. A hand crank 96 is provided on the motor shaft to permit manual operation of the mechanism. A suitable valve 97 of known construction, operated by a knob 98, controls the flow of hydraulic fluid through the motor 94.

The mechanism for reciprocating the diamond points 36 and 36' during oscillatory movement of the plate 43 will now be described. Referring first to Fig. 18 which illustrates a part of the mechanism in simplified and exploded perspective, the pinion 47 is fixed to a shaft 99. The shaft 99 may be considered as journaled in the plate 43. The shaft is actually journaled in a unit that is clamped to the plate 43 as hereinafter described in detail. A pinion 100 fixed to the opposite end of the shaft 99 engages a rack 101 on a cam bar slide 102 which is vertically slidable on a slide way 103. A cam bar support 104 is fixed to the cam bar slide 102 and carries a cam bar 142 disposed at an angle to the path of travel of the slide 102. A roller 106 engaging the cam bar 142 is carried by a pin 107 fixed to a slide 108 movable at right angles to the slide 102 between the ball slide ways 109 and 111. A spring 117 holds the roller 106 against the cam bar 142. A diamond slide 110 moves parallel to the slide 108 on the ball slide way 111 and carries the diamond point 36. The slides 108 and 110 are connected by a multiplying mechanism comprising a lever 112 fulcrumed on a pin 113 fixed in the part 109. The lever 112 has a longitudinally extending central opening 114 into which rollers 115 and 116, respectively carried by the slide 108 and the slide 110, extend. With the arrangement described, the diamond slide 110 is moved at substantially three times the speed of movement of the slide 108. From the above description of the mechanism shown in Fig. 18, it is apparent that rotation of the plate 43 about the shaft 39 causes rotation of the pinion 47 engaging the stationary gear segment 44, and the pinion acts through the slide 102, the cam bar 142 and the roller 106 to reciprocate the slide 108 and the diamond point slide 110.

The construction of the diamond point supporting and reciprocating mechanism will now be described in detail. The front and rear dresser units F and R are respectively mounted in frame units 118 and 119, each of which has an extension, 120 and 121, embracing and journaled on the bushing 48 of the stub shaft 39 (Figs. 6, 7 and 17). A cap 105 secured by a screw 240 holds the units 120 and 121 as well as the plate 43 in place on the bushing 48. The construction of the two dresser units F and R is identical, and the details of the rear dresser unit R only will be described, the corresponding parts of the front unit F being designated with like reference characters having distinctive exponents.

The frame unit 119 of the rear dresser unit R bears against the outer face of the plate 43 and is adjustably clamped thereto by the screws 122 and 123 (Fig. 6). The screw 122 threadedly engages the frame 119 and its head rests in an arcuate slot 124 in the plate 43 as shown in Figs. 5 and 6. The screw 123 passes through an arcuate slot 125 in the frame 119 and threadedly engages one of a number of arcuately disposed openings 126 in the plate 43 (Figs. 5, 6, 7 and 20). The pinion 47 is releasably secured to the tapered end 127 of the shaft 99 by a cap screw 128. This pinion 47 is preferably formed in two mating parts 129 and 130 adjustably clamped together by cap screws 131 which pass through slots 132 in the pinion part 130 (Figs. 5 and 6). A set screw 133 threadedly engaging a stud 134 fixed to the pinion part 129 and passing through a slot 135 in the part 130 engages a post 150 on the part 130 to provide accurate relative adjustment of the parts. By slightly circumferentially displacing the pinion parts 129 and 130, all back lash between the pinion and the gear segment 44 can be eliminated.

The pinion shaft 99 is journaled in a bushing 136 fixed to the unit frame 119 and passing through an arcuate slot 137 in the plate 43. The pinion 100 extends within the unit frame 119 and engages the rack 101 on a movable cam bar slide 102 carried by a slide way 103 fixed to the unit frame 119 (Figs. 6, 7 and 14). The outer face of the cam bar slide 102 carries a cam bar support 104 pivotally connected thereto at 138 (Fig. 10). An arcuate clamp 139 secured by screws 140 releasably locks the lower end of the cam bar support 104 to the slide 102. The outer face of the cam bar support 104 is recessed as shown in Fig. 18 and a cam bar 141 having a plane cam surface 142 is fixed to one side of the recess as shown in Fig. 10. The cam bar support 104 may be adjusted to various angular positions about its pivot 138 between a set screw stop 143 in the cam bar slide 102 and a reference plate 144 mounted on the opposite side of the slide 102. The angle of the cam bar 141 is set accurately by inserting a gauge block between the plate 144 and an arcuate surface 145 on the cam bar support 104.

The frame 119 has a cover plate 146 on its outer face, and two ball slide ways 109 and 111 are suitably secured to the outer face of the cover (Figs. 6, 13 and 14). The cover plate 146 has a horizontally extending slot 147 therethrough, one end of which is in line with the pivot 138 of the cam bar support 104 when the slide 102 is in its lowest position against the stop 148 as shown in Figs. 7, 9 and 13. The stop 148 is employed to set the diamond point at its original position on the base circle. The slide 108 is mounted between balls 149 in the slide ways 109 and 111 as shown in Fig. 15, and has an integral pin 107 thereon passing through the slot 147 and into the cam bar support recess. A roller 106 rotatably secured to the end of the pin 107 engages the plane surface 142 of the cam bar 141. The arrangement is such that with the cam bar slide 102 at its lowest position against the stop 148, the pin 107 and roller 106 are axially aligned with the axis of the cam bar support pivot 138. This makes it possible at this position to adjustably set the angle of the cam bar without causing movement of the diamond point or slide.

The slide 108 is biased to move toward the center of the plate 43 by a spring 117 which is tensioned between a pin 151 fixed to the unit cover plate 146 and a pin 152 fixed in and extending transversely of the slide 108 (Fig. 14). The spring 117 extends through a longitudinal opening 153 in the slide 108 and holds the roller 106 in continuous engagement with the plane surface 142 of the cam bar 141.

The outer face of the slide 108 carries an adjustable plate 154 fixed thereto by screws 155 passing through slots 156 as shown in Fig. 16. The plate 154 may be adjustably moved longitudinally independently of the slide 108 by set screws 157 and 158 engaging its opposite ends. The set screw 157 threadedly engages a block 159 fixed to the slide 108 by the pin 152, and the set screw 158 threadedly engages a bar 160 fixed to the slide 108 through a post 161. A roller 115 is journaled on a pin 162 fixed to the plate 154. A similar roller 116 is journaled on a pin 163 fixed to the diamond slide 110. The diamond slide 110 embraces the slide way 111 and travels on the balls 149 as shown in Fig. 13. The lever 112 is pivotally supported on a pin 113 fixed in the slide way 109 and has a counter weight 164 secured thereto and extending beneath the slide unit as shown in Figs. 13, 15, 16 and 17. The longitudinally extending central recess 114 of the lever 112 receives the rollers 115 and 116, and these rollers respectively engage bearing surfaces 165 and 166 in the lever as shown in Fig. 17. In the disclosed embodiment, the distance between the axes of the rollers 115 and 116 is twice the distance between the axes of the lever pivot pin 113 and the roller 115. Accordingly, the lever 112 multiplies the motion of the slide 108 by three in transmitting motion to the diamond slide 110.

In dressing wheels for grinding small gears, multiplication of the slide motion is unnecessary, and the slides 108 and 110 are locked together to move in unison. As shown in Fig. 23, this may be accomplished by a plate 167 suitably fixed to the slide 110 and carrying oppositely disposed set screws 168 engaging opposite surfaces of a pin 170 fixed to the slide 108.

The diamond point 36 is secured to the slide 110 with its axis parallel to the path of travel of the slide by fixtures illustrated in Figs. 13, 16 and 21 to 24. As best shown in Figs. 22 and 24, the diamond point 36 is clamped in a groove 171 of a block 172 by a set screw 173, and may be adjustably moved axially by a screw 174 carrying a cone-shaped collar 175 engaging the back end of the diamond point 36. The block 172 is secured to the diamond slide 110 by cap screws 176 which engage vertical slots 177 in the block 172 (Figs. 16 and 17). The block 172 is adjusted vertically (that is, transversely of the path of the slide 110) by inserting a sleeve 178 of suitable length between a lug 179 fixed to and extending laterally from the bottom of the slide 110 and the under surface of the block 172. The sleeve 178 is supported and clamped in place by a screw 180 (Figs. 16 and 23).

Adjustment of the diamond point carrying block 172 transversely of the path of the slide 110 determines the base circle diameter of the gear to be finished by the involute profile dressed by the diamond point. The diamond point carrying block 172 described is suitable for a limited range of base circle diameters, but for relatively large base circles, diamond point supports of greater length are employed. Supports of this type are shown in Figs. 21 and 22. As there illustrated, the support 181 for the diamond point 36 is of considerable length and is provided with long slots 182 for the reception of the cap screws 176. The position of the support 181 is determined by the length of the sleeve 183 clamped by the screw 184 between the bottom of the support 181 and the lug 179 secured to the bottom of the slide 110.

Suitable reference pins and surfaces are provided for checking the stroke angle of the dresser and setting the tooth thickness of the involute profile dressed. A reference plate 185 is fixed to the upper edge of the plate 43 adjacent the rear dresser unit R, and a part 186 of the plate 185 extends out beyond the outer face of the plate 43, as shown in Fig. 20a. A reference pin 187 is fixed to the dresser frame 38 and extends over the plate 185 as shown in Figs. 2, 4 and 20. Means are provided for securing a pin 188 in a lower position as indicated in Figs. 4 and 20. A reference disc 189 is fixed to the frame 119 of the rear dresser unit R adjacent its upper edge and beneath the reference plate part 186. As shown in Fig. 20a, the disc 189 may be fixed to a plug 190 secured within an opening 191 in the frame 119 by a screw 192 engaging a washer 193. A corresponding reference disc 189' is similarly secured to the frame 118 of the front dresser unit F beneath the outwardly extending part 186' of the reference plate 185' (Fig. 20).

In setting up the disclosed embodiment of my improved involute dresser to dress involute profiles of a predetermined size, the diamond points 36 and 36' are set so as to lie on the base circle of the desired involute profile when the mechanism is in the zero position and in the end of stroke position respectively. For this purpose, sleeves 178 and 178' of suitable length are inserted beneath the diamond point supporting blocks 172 and 172' as described above. The stroke of the dresser is then adjusted to the desired value by loosening the locking pins 66 and 91 and turning the adjusting screws 73 and 80 until the effective arm of the crank 58 is set to a value to produce the desired angle of stroke of the plate 43, after which the pins 66 and 91 are tightened. This adjustment is made with the crank locked in its most rearward position by insertion of the pin 86 in the opening 90 of the gear 85 (Fig. 1). This position of the mechanism is herein termed the zero position, and with the mechanism so locked, the position of the plate 43 may be checked by measuring the clearance between the reference pin 187 and the top of the reference plate 185 on the edge of the plate 43 (Fig. 20). This clearance for proper zero position is .050 inch in the disclosed dresser. The stroke angle of the plate 43 may be checked by rotating the gear 85 180° from the zero position and locking it in the new position by the pin 86. This new position is termed the end of stroke position herein. The stroke angle is then measured by inserting a gauge block of proper length between the reference pin 187 and the top of the plate 185. If the stroke angle is greater than about 38°, the gauge block may be inserted between the plate 185 and a pin in the position indicated at 188 in Fig. 20.

The two dresser units F and R are then set for tooth thickness. In general, this is accomplished by moving the dresser units circumferentially on the plate 43 so as to move the diamond points, 36 and 36', along the base circle a sufficient distance to produce the tooth thickness desired. With the mechanism locked in the zero position as described, the rear dresser unit R is released from the plate 43 by loosening the screws 122 and 123 (Fig. 6) and a gauge block of proper length is inserted between the reference disc 189 on the unit and the under surface of the outwardly extending part 186 of the reference plate 185 on the plate 43. The rear unit clamping screws 122 and 123 are tightened when the unit has been moved to the position determined by the gauge block. The front dresser unit F is similarly set for tooth thickness with the mechanism locked in the end of stroke position, and in this case, the length of the gauge block represents the angle of stroke, plus one-half the tooth thickness.

The cam bar angle is set so as to correctly relate the rate of movement of the diamond slide 110 to the rate of rotation of the plate 43. In setting the cam bar angle of the rear unit R, the screws 140 of the cam bar support clamp 139 are loosened (Fig. 10) and the pinion 47 is loosened or removed from the shaft 99. The cam bar slide 102 is forced down by hand to its lowest position against the stop 148 (Fig. 13). This places the diamond point 36 on the base circle for which the dresser has been set. The pinion 47 is tightened on its shaft 99 by means of the screw 128. A gauge block of proper length is then set between the reference plate 144 and the arcuate surface 145 on the cam bar support 104, thus setting the cam bar 141 at the proper angle, whereupon the clamp screws 140 are tightened and the support 104 is thereby locked in its adjusted position. The cam bar angle of the front dresser unit F is similarly set with the mechanism locked in the end of stroke position, the pinion 46 being first loosened, the cam bar slide 102, forced to its lowest position against the stop 148' and the pinion 46 tightened before the cam bar angle is set.

The diamond points 36 and 36' are then set to extend the proper distance from the faces of the blocks 172 and 172' (in the disclosed embodiment, this distance is .7500 inch), the dresser mechanism is unlocked by retracting the pin 86 and the device is ready for operation to dress involute profiles on a grinding wheel 31 which is generally accomplished as explained above.

In operation, the plate 43 oscillates through its stroke angle about the shaft 39, and the diamond points 36 and 36' slide relative to the plate 43 in opposite directions along straight paths tangent to circles concentric with the rotational axis of the plate and at a rate directly proportional to the rate of turning movement of the plate 43 about its axis. This moves the points 36 and 36' in opposite directions along oppositely disposed true involute curves, as illustrated in Figs. 7 and 17. The axes of the points 36 and 36' are at all times tangent to the base circle of the involute being dressed, and the point axes are accordingly normal to the profile that they dress, which results in highly accurate dressing. The crank motion of the drive mechanism produces smooth deceleration, reversal and acceleration of the plate 43 at the zero and end of stroke positions, thus avoiding shock or dwell of the mechanism which would produce inaccuracies.

The above described embodiment of my improved involute dresser produces a true involute profile throughout the gear tooth forming face of the grinding wheel 31. In certain cases it is deemed desirable to produce a tooth profile having a slightly raised portion at and adjacent the pitch diameter of the gear. A modified gear tooth of this type is illustrated in Fig. 12. It has raised portions 194 at and adjacent the pitch circle 195, and these portions as well as the other parts of the tooth faces have involute curvature. The height of the raised portions 194 above the normal involute curve 196 has been considerably exaggerated for the purpose of illustration.

In accordance with my invention, the dresser may be adapted to produce profiles of the type illustrated in Fig. 12 by the use of a modified cam bar illustrated at 197 in Fig. 11. This bar has a recess 198 in the roller engaging surface thereof, which recess departs from a plane surface by the distance $b$ for a linear distance $a$ so located as to produce a recess in the dressing wheel face at and adjacent the pitch diameter of the gear that the wheel is to dress. When the roller 106 travels along the cam bar 197, it follows the recess 198 and thus so moves the diamond point as to produce a recess of involute curvature therein which in turn produces the raised portions 194 on the gear tooth face. The recess 198 illustrated in Fig. 11 is of exaggerated size for the purpose of illustration. The recess 198 has a plane surface over the distance $a$, and the raised portion 194 is accordingly of involute curvature at and adjacent the pitch diameter of the gear.

The disclosed embodiment of my improved involute dresser is adjustable to a wide variety of gear sizes without the use of spare parts. A simplified embodiment of the invention illustrated in Figs. 25 to 29 employs removable constant rise cams to propel the diamond points relative to the face plate, and each set of cams is designed to dress involute profiles for one specific gear design. The frame structure, drive mechanism and face plate of this embodiment are identical with like parts of the previously described embodiment, and the description of these parts will not be repeated. The face plate 200 carries two dresser units F' and R' of substantially identical construction and the construction of the rear unit R' only will be described in detail, the corresponding parts of the front unit F' being designated with like reference characters having distinctive exponents.

The frame member 201 of the unit R' is adjustably movable about the axis of the face plate 200 and is clamped to that plate by the screws 202 and 203 as in the previously described embodiment. The shaft 204 of the split pinion 205 which engages the fixed gear segment 44' is carried in a journal 206 fixed to the frame member 201 and extending through an arcuate slot 207 in the plate 200. A pinion 208 fixed to the outer end of the shaft 204 meshes with a gear 209 fixed to the inner end of a shaft 210 journaled in the member 201. The outer end of the shaft 210 carries an integral head 211 having radially extending recesses 212 in its edge as shown in Figs. 27 and 28. The cam 214 carries a pin 215 on its inner face, which pin engages one of the recesses 212 and so locks the cam against rotation on the head 211. The cam 214 is held on the head 211 by a cap 216 secured by a screw 217. An extension 218 of the frame member 201 has a bushed opening 219 therein adjacent the cam 214 and an opening 220 in the cam, aligned with one of the recesses 212, registers with the opening 219 when the cam is in the position in which the diamond slide 221 is fully retracted with the diamond point 222 on the base circle of the involute profile 238 being dressed.

The slide 221 embraces a ball slide way 223 fixed to the frame 201, and balls 224 are interposed between the slide and the slide way as shown in Fig. 27. A fixture 225 adjustably secured to the outside face of the diamond slide 221 by the screws 226 passing through the slots 227, has a depending arm 228 carrying a cam follower pin 229 engaged by the edge of the cam 214 (Figs. 26, 28 and 29). A spring 230, tensioned between a pin 231 on the slide 221 and a pin 232 on the member 201 maintains the cam follower pin 229 in engagement with the cam 214 and propels the slide 221 as the cam 214 is rotated in the direction of the arrow in Fig. 26. A stop 233 fixed to the end of the slide way 223 overlaps the end of the slide 221 as shown in Figs. 25, 26 and 28. The diamond point 222 is secured to the slide 221 by an adjustable block 234 and clamping mechanism identical with that illustrated and described in connection with the first disclosed embodiment of my dresser.

The dresser units R' and F' are adjustably set circumferentially of the plate 200 for proper tooth thickness in the manner described in connection with the cam bar type embodiment, the gauge blocks for this purpose being set between the under surfaces of the reference plates 235 or 235' on the plate 200 and the reference discs 236 or 236' on the unit members 201 and 201'. During these operations, the slides 221 and 221' are locked in their retracted positions in which the diamond points 222 or 222' are on the base circle. This is accomplished by inserting a pin 237 in the aligned openings 219 and 220 (Fig. 27). The angle of stroke setting and checking is the same as has been described in connection with the cam bar embodiment.

The operation of the cam type dresser is essentially the same as that of the cam bar type except that the linear motion of the diamond point slides 221 and 221' relative to the plate 200 is produced by the direct action of a constant rise cam on the slide rather than by an angularly disposed cam bar. The diamond points 222 and 222' oscillate in opposite directions along involute curves with their axes tangent to the base circle of the involute at all times while dressing and normal to the profiles dressed, whereby accurate and precise dressing is obtained. The dresser may be adjusted for different gear designs by employing differently shaped pairs of cams in place of the cams 214 and 214'.

I claim:

1. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means for oscillating said plate about said axis, a circular surface concentric with said axis fixed to said stationary part, and means independent of said plate oscillating means and including a rotary element journaled in said plate and engaging said circular surface for reciprocating said point along said path relative to said plate at a rate directly proportional to the rate of movement of said plate about said axis said rotary element being driven by the oscillation of said plate relative to said circular surface.

2. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means for oscillating said plate about said axis, a toothed gear surface concentric with said axis fixed to said stationary part, and means independent of said plate oscillating means and including a pinion rotatably supported by said plate and engaging said toothed gear surface for reciprocating said point along said path relative to said plate at a rate directly proportional to the rate of movement of said plate about said axis.

3. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means including a uniformly rotating crank, a rotary part and a link connecting said crank to said rotary part for oscillating said plate about said axis, a toothed gear surface concentric with said axis fixed to said stationary part, means including a pinion rotatably supported by said plate and engaging said toothed gear surface for reciprocating said point along said path relative to said plate at a rate directly proportional to the rate of movement of said plate about said axis, and means for adjustably varying the effective length of said crank whereby the angle through which said plate is oscillated may be varied.

4. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means including a uniformly rotating crank, a rotary part and a link connecting said crank to said rotary part for oscillating said plate about said axis, a toothed gear surface concentric with said axis fixed to said stationary part, means including a pinion rotatably supported by said plate and engaging said toothed gear surface for reciprocating said point along said path relative to said plate at a rate directly proportional to the rate of movement of said plate about said axis, and means for adjustably varying the effective length of said crank and the length of said link whereby the angle therethrough which said plate is oscillated may be varied without changing one of the extreme positions of said plate.

5. In a device of the character described, in combination, a stationary part, a plate mounted to rotate relative to said stationary part about a fixed axis, a pair of cutting points respectively slidably supported on said plate to move in a plane normal to said axis along straight paths tangent to a circle concentric with the rotational axis of said plate, means for oscillating said plate about said axis, a circular surface concentric with said axis and fixed to said stationary part and means independent of said plate oscillating means including rotary elements journaled in said plate and each engaging said circular surface for reciprocating said respective points along said paths in substantially the same direction when said plate is oscillated and at equal rates directly proportional to the rate of oscillation of said plate.

6. In a device of the character described, in combination, a stationary part, a plate mounted to rotate relative to said stationary part about a fixed axis, a pair of cutting points respectively slidably supported on said plate to move in a plane normal to said axis along straight paths tangent to a circle concentric with the rotational axis of said plate, means for oscillating said plate about said axis, a circular surface concentric with said axis and fixed to said stationary part, means including rotary elements journaled in said plate and each engaging said circular surface for reciprocating said respective points along said paths in substantially the same direction when said plate is oscillated and at equal rates directly proportional to the rate of oscillation of said plate, and means for adjusting said points independently of each other and of the movement of said plate to adjusted positions on said plate circumferentially of said axis while maintaining the path of reciprocatory movement of said points relative to said plate tangent to a circle concentric with the rotational axis of said plate.

7. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means for oscillating said plate about said axis, a slide supported on said plate and movable in a plane normal to said axis along a straight path substantially at right angles to the path of said cutting point, a substantially straight cam bar carried by said slide and disposed at an angle to the path of said slide, means movable in a path substantially parallel to the path of said cutting point engaging said bar and connected to propel said cutting point along its path, and means carried by said plate and driven by the relative movement of said plate and said stationary part and independently of said plate oscillating means for reciprocating said slide relative to said plate upon oscillation of said plate about said axis, whereby said cutting point is reciprocated.

8. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means for oscillating said plate about said axis, a slide supported on said plate and movable in a plane normal to said axis along a straight path substantially at right angles to the path of said cutting point, a substantially straight cam bar carried by said slide and adjustably movable to positions at various angles to the path of said slide, means movable in a path substantially parallel to the path of said cutting point engaging said bar and connected to propel said cutting point along its path, and means carried by said plate and driven by the relative movement of said plate and said stationary part and independently of said plate oscillating means for reciprocating said slide relative to said plate upon oscillation of said plate about said axis, whereby said cutting point is reciprocated.

9. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means for oscillating said plate about said axis, a slide supported on said plate and movable in a plane normal to said axis along a straight path substantially at right angles to the path of said cutting point, a cam bar carried by said slide and having a substantially plane surface with a shallow recess therein disposed at an angle to the path of said slide, a cam bar follower movable in a path substantially parallel to the path of said cutting point and continuously engaging said substantially plane surface of said cam bar, a driving connection between said cam bar follower and said cutting point and means carried by said plate and driven by the relative movement of said plate and said stationary part for reciprocating said slide relative to said plate upon oscillation of said plate about said axis, whereby said cutting point is reciprocated.

10. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, a slide supported on said plate and movable in a plane normal to said axis along a straight path substantially at right angles to the path of said cutting point, a substantially straight cam bar carried by said slide and disposed at an angle to the path of said slide, a cam bar follower movable in a path substantially parallel to the path of said cutting point and continuously engaging said cam bar, a motion multiplying mechanism connecting said cam bar follower to move said cutting point and means carried by said plate and driven by the relative movement of said plate and said stationary part for reciprocating said slide relative to said plate upon oscillation of said plate about said axis, whereby said cutting point is reciprocated.

11. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means for oscillating said plate about said axis, a rotary cam carried by said plate and driven by the relative movement of said plate and said stationary part, and a cam follower engaging said cam and connected to said cutting point whereby said point is reciprocated upon oscillation of said plate.

12. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means for oscillating said plate about said axis, a circular rotary cam carried by said plate, a circular surface concentric with said axis and fixed to said stationary part, means including a rotary element journaled in said plate and engaging said circular surface for oscillating said cam upon oscillation of said plate, and a cam follower engaging said cam and connected to said cutting point whereby said point is reciprocated relative to said plate upon oscillation of said plate and said cam.

13. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means for oscillating said plate about said axis including a driven crank arm, a rotary member and a link connecting said crank arm and said rotary member, means for variably adjusting the effective length of said crank arm, and means carried by said plate and driven by the relative movement of said plate and said stationary part for reciprocating said point along said path relative to said plate.

14. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means for oscillating said plate about said axis including a driven crank arm, a rotary member and a link connecting said crank arm and said rotary member, means for variably adjusting the effective length of said crank arm and the point of connection of said link to said rotary member whereby the angle of stroke of said plate may be varied without changing one of the end positions of said plate, and means carried by said plate and driven by the relative movement of said plate and said stationary part for reciprocating said point along said path relative to said plate.

15. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means for oscillating said plate about said axis including a driven crank arm, a rotary member and a link connecting said crank arm and said rotary member, means for releasably locking said crank arm in either of its extreme positions, and means carried by said plate and driven by the relative movement of said plate and said stationary part for reciprocating said point along said path relative to said plate.

16. In a device of the character described, in combination, a stationary part, a plate mounted to rotate relative to said stationary part about a fixed axis, a cutting point slidably supported on said plate to move in a plane normal to said axis along a straight path tangent to a circle concentric with the rotational axis of said plate, means for oscillating said plate about said axis including a driven crank arm, a rotary member and a link connecting said crank arm and said rotary member, means for variably adjusting the effective length of said crank arm, means for releasably locking said crank arm in either of its extreme positions, and means carried by said plate and driven by the relative movement of said plate and said stationary part for reciprocating said point along said path relative to said plate.

JOSEPH J. OSPLACK.

REFERENCES CITED

The following references are of record in the file of this patent:

UNITED STATES PATENTS

| Number | Name | Date |
| --- | --- | --- |
| 1,907,065 | Halborg et al. | May 2, 1933 |
| 1,912,410 | Shotey | June 6, 1933 |
| 2,237,975 | Wainwright | Apr. 8, 1941 |
| 2,274,959 | Headbloom et al. | Mar. 3, 1942 |